(No Model.)
H. KIENTH.
PERCOLATOR.
No. 411,596.  Patented Sept. 24, 1889.
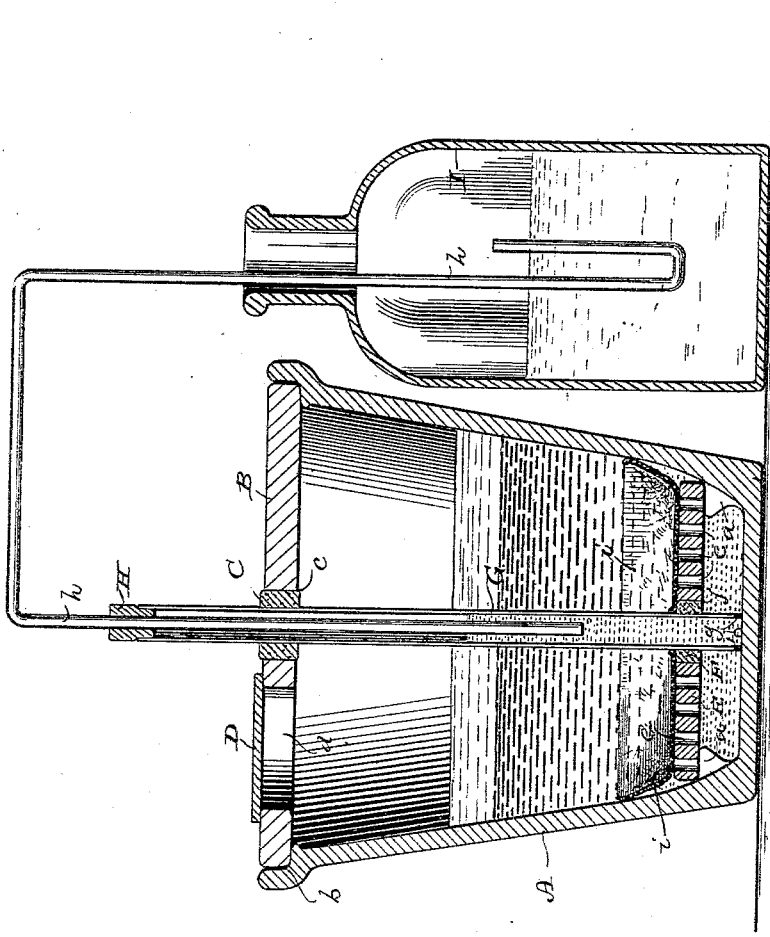
Witnesses
Geo. W. Young
Wm. Klug
Inventor
Hans Kienth
By Stout & Underwood
Attorneys

UNITED STATES PATENT OFFICE.

HANS KIENTH, OF MILWAUKEE, WISCONSIN.

PERCOLATOR.

SPECIFICATION forming part of Letters Patent No. 411,596, dated September 24, 1889.

Application filed June 24, 1889. Serial No. 315,421. (No model.)

*To all whom it may concern:*

Be it known that I, HANS KIENTH, of Milwaukee, in the county of Milwaukee, and in the State of Wisconsin, have invented certain new and useful Improvements in Percolators; and I do hereby declare that the following is a full, clear, and exact description thereof.

My invention relates to percolators especially designed for druggists' use; and it consists in certain peculiarities of construction, as will be fully set forth hereinafter and subsequently claimed.

The drawing is a vertical central section through my improved device and a vial being filled therefrom, illustrating the operation of my invention.

A represents the outer vessel of the percolator, of any suitable material—such as glass or earthenware—in the lower part of which are cast or formed lugs $a\,a$, while the upper part of the vessel is formed with a shoulder $b$, for the reception of a cover B, centrally perforated, as shown at $c$, to receive a perforated cork C, and having another opening $d$ at one side of the center with a cover D.

E is a disk, formed of any suitable material, (preferably of glass or earthenware, like the vessel A, but which may be of wood, rubber, or metal, or other substance,) provided with series of perforations $e\,e\,e$, which is designed to rest on the described lugs $a\,a$, and which has a central perforation $f$, (larger than the series of perforations $e\,e\,e$,) for the reception of a perforated cork F in vertical line with the perforated cork C in the cover B; and G is a tube (preferably of glass) passed down through the two perforated corks just named, and having openings, holes, or notches $g\,g$ at its lower end and a perforated cork H at its upper end, which latter receives one end of the siphon-tube $h$, whose other end is shown within the vial I that is to be filled; and $i$ is a piece of felt or flannel having a central hole, by means of which it is fitted on the tube G and pushed down to rest on the perforated disk E, the outer edge of the piece $i$ resting against the inner walls of the vessel, so as to form a sort of cup, the diameter of the cloth or felt $i$ being greater than that of the vessel A at this point.

The operation of my device will be readily understood from the foregoing description of its construction. The drug or other material is put within the vessel (through the opening $d$) resting on the cloth or felt cup $i$, and the alcohol or other fluid poured in on top of this, gradually percolating through the fabric $i$ and perforated disk E to the bottom of the vessel A, thence (in a clear condition) finding its way through the openings $g\,g$ into the tube G, and thence, by reason of the siphon $h$, being drawn into the vial I or other receptacle.

My device is very simple and inexpensive and a great improvement on the percolators in common use.

Having thus described my invention, what I claim as new, and desire to secure by Letters Patent, is—

1. In a percolator, the combination, with a vessel having interior supporting-lugs near its bottom, of a perforated disk resting on said lugs, a tube extending within said glass and passing through said perforated disk, and a siphon extending into said tube, substantially as set forth.

2. In a percolator, the combination, with a vessel having interior supporting-lugs near its bottom, of a perforated disk resting on said lugs and having a central larger perforation fitted with a perforated cork, a top or cover with similar central perforation and perforated cork, a tube passed through said perforated corks and having a perforated cork at its upper end and openings or notches at its lower end, and a siphon, one end of which is passed through the last-named perforated cork and extended down within said tube, substantially as set forth.

3. In a percolator, the combination, with a vessel having interior supporting-lugs near its bottom, of a perforated disk resting on said lugs and having a central perforation fitted with a perforated cork, a tube having a perforated cork at its upper end and openings at its lower end, passed through said first-named perforated cork, a siphon fitted in said tube, and a cup of felt or cloth having a central perforation fitting around said tube and resting on said perforated disk and against the inner walls of the said vessel, substantially as set forth.

In testimony that I claim the foregoing I have hereunto set my hand, at Milwaukee, in the county of Milwaukee and State of Wisconsin, in the presence of two witnesses.

HANS KIENTH.

Witnesses:
 H. G. UNDERWOOD,
 WM. KLUG.